US007508772B1

(12) United States Patent
Ward et al.

(10) Patent No.: US 7,508,772 B1
(45) Date of Patent: Mar. 24, 2009

(54) PARTIAL GRACEFUL RESTART FOR BORDER GATEWAY PROTOCOL (BGP)

(75) Inventors: David D. Ward, Somerset, WI (US); Chandrashekhar Appanna, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 468 days.

(21) Appl. No.: 11/445,845

(22) Filed: Jun. 2, 2006

(51) Int. Cl.
*H04L 12/28* (2006.01)
*H04L 12/56* (2006.01)

(52) U.S. Cl. .................................. 370/254; 370/401
(58) Field of Classification Search ......... 370/242–246, 370/252–255, 389, 392, 400, 401
See application file for complete search history.

(56) References Cited

U.S. PATENT DOCUMENTS

| | | | |
|---|---|---|---|
| 6,704,795 B1 * | 3/2004 | Fernando et al. ............. | 709/237 |
| 7,359,377 B1 * | 4/2008 | Kompella et al. ............ | 370/389 |
| 2006/0209851 A1 * | 9/2006 | Scudder et al. .............. | 370/401 |
| 2006/0262734 A1 * | 11/2006 | Appanna et al. ............. | 370/254 |
| 2007/0014231 A1 * | 1/2007 | Sivakumar et al. ........... | 370/216 |
| 2007/0064698 A1 * | 3/2007 | Appanna ..................... | 370/392 |
| 2007/0121524 A1 * | 5/2007 | Rangarajan et al. .......... | 370/252 |
| 2008/0089231 A1 * | 4/2008 | Appanna et al. ............. | 370/235 |

OTHER PUBLICATIONS

R. Chandra, et al., "Capabilities Advertisement with BGP-4", Memo, Network Working Group Request for Comments: 3392, dated Nov. 2002, 6 pgs.

T. Bates, et al., "Multiprotocol Extensions for BGP-4", Memo, Network Working Group Request for Comments: 2858, dated Jun. 2000, 10 pgs.

Srihari R. Sangli, et al., "Graceful Restart Mechanism for BGP draft-ietf-idr-restart-10.txt", Memo, Network Working Group Internet Draft, dated Jun. 2004, 11 pgs.

L. Anderson, et al., "LDP Specification", Memo, Network Working Group Request for Comments: 3036, dated Jan. 2001, 118 pgs.

(Continued)

*Primary Examiner*—Wing F. Chan
*Assistant Examiner*—Hong Sol Cho
(74) *Attorney, Agent, or Firm*—Hickman Palermo Truong & Becker LLP

(57) ABSTRACT

A method and apparatus for partial graceful restart in Border Gateway Protocol (BGP) are disclosed. A first BGP host detects that a first BGP session established between the first BGP host and a second BGP host has become unavailable. In a Forwarding Information Base (FIB) at the first BGP host, a first set of one or more routes to one or more address destinations is replaced with a second set of one or more routes to the one or more address destinations. The first set of one or more routes indicates that the one or more address destinations are reachable through the second BGP host. The second set of one or more routes indicates that the one or more address destinations are reachable through a third BGP host. The first BGP host receives a BGP OPEN message from the second BGP host to open a new BGP session between the first BGP host and the second BGP host. In response to receiving the BGP OPEN message, the first set of one or more routes is re-installed in the FIB at the first BGP host.

33 Claims, 5 Drawing Sheets

OTHER PUBLICATIONS

Y. Rekhter, et al., "A Border Gateway Protocol 4 (BGP-4)", Memo, Network Working Group Request for Comments: 1771, dated Mar. 1995, 51 pgs.

D. Katz, et al., "Bidirectional Forwarding Detection draft-ietf-bfd-base-94.txt", Memo, Network Working Group Internet Draft, date Oct. 2005, 44 pgs.

* cited by examiner

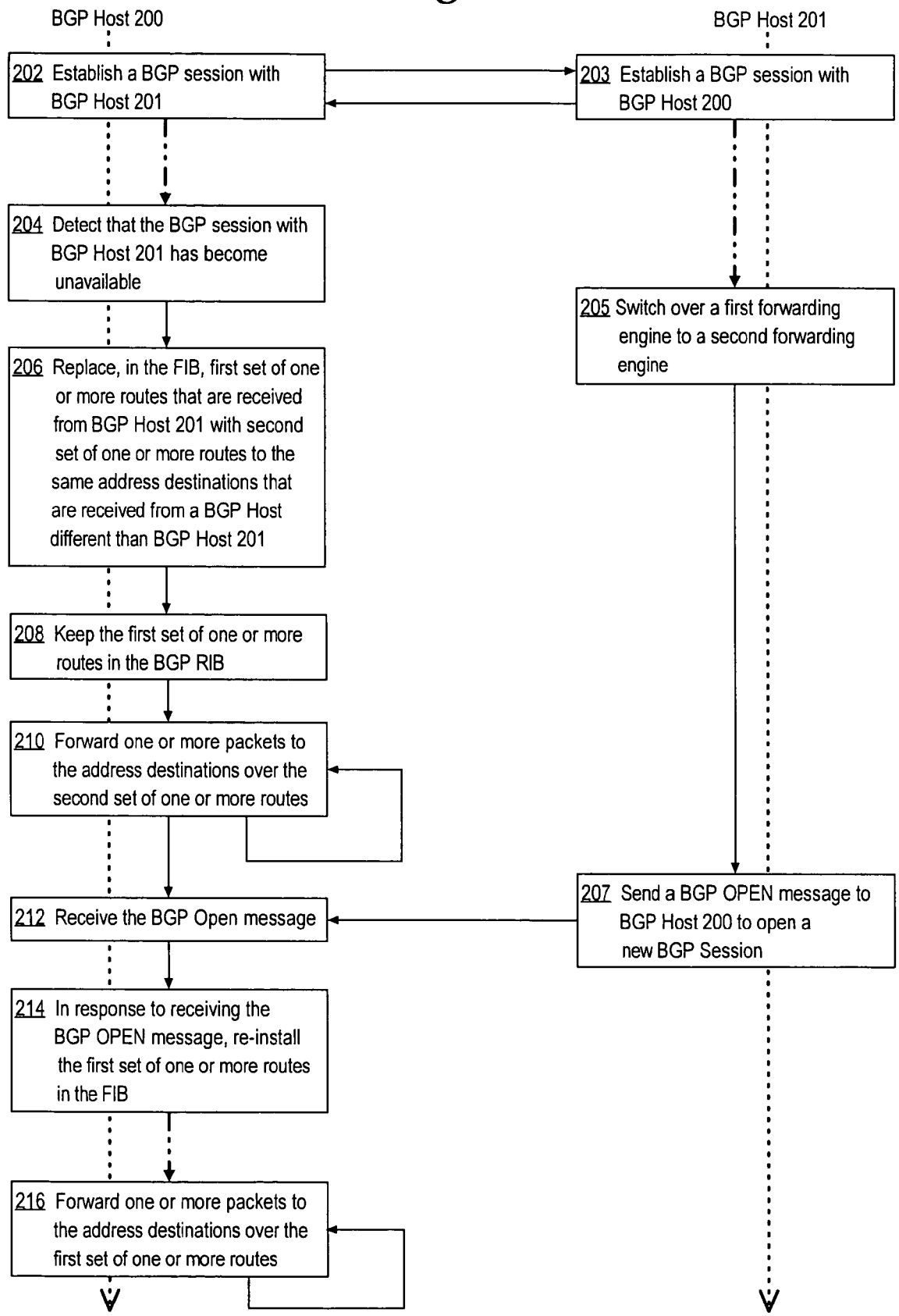

PARTIAL GRACEFUL RESTART FOR BORDER GATEWAY PROTOCOL (BGP)

FIELD OF THE INVENTION

The present invention generally relates to network routing. The invention relates more specifically to a technique for partial graceful restart in Border Gateway Protocol (BGP).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is an exterior gateway protocol (EGP) that is used to exchange routing information among network elements in the same or different autonomous systems. A network element is a device that is configured for managing, processing, and/or forwarding network traffic. (Examples of network elements include, but are not limited to, repeaters, bridges, switches, and routers.) A network element that executes one or more BGP processes is referred to herein as a BGP host or a BGP device. In order to exchange BGP routing information, two BGP hosts first establish with one another a transport protocol session such as, for example, a Transmission Control Protocol (TCP) session. The BGP hosts then establish a BGP peering session by exchanging, over the transport protocol session, a series of BGP OPEN messages that define the parameters of the BGP session. After the BGP session is open, the BGP hosts (performing as BGP peers) exchange all of their routing information. Thereafter, only updates or changes to the routing information are exchanged, or advertised, between the BGP hosts. The exchanged routing information is maintained by the BGP hosts during the existence of the BGP session.

The routing information exchanged during a BGP session includes routes to address destinations in one or more networks. A route comprises an address prefix of the destination (also referred to as prefix), and attributes that describe the path to the destination. At a BGP host, routes are stored in one or more Routing Information Bases (RIBs), where each BGP process executing on the BGP host typically manages its own RIB. In a typical BGP implementation, a BGP RIB may include three distinct portions: (a) Adj-RIBs-In, which stores routes received from BGP peers or learned from other protocols, (b) Loc-RIB, which stores routes that the BGP process has selected by applying its local policies to the routes stored in Adj-RIBs-In, and (c) Adj-RIBs-Out, which stores routes that the BGP process has selected for advertisement to its BGP peers. A BGP RIB may be implemented as a single physical routing table that includes each of the three portions as separate logical tables, as separate physical routing tables, or as some combination of one or more logical and/or physical routing tables.

The routes that a BGP host stores in a Adj-RIBs-In are typically received over a BGP session established with another BGP host. The routes stored in a Loc-RIB of the BGP host are selected from the routes in a Adj-RIBs-In by applying one or more route selection algorithms. The routes selected by the BGP host and stored in the Loc-RIB usually represent the best paths to the routes' respective address destinations. Once the best route to a certain address destination is selected and stored in the Loc-RIB, the BGP host advertises the route to its BGP peers by placing (or storing) the route in Adj-RIBs-Out.

Some or all of the best routes stored in a Loc-RIB are installed in a Forwarding Information Base (FIB) that is associated with the BGP process that manages that Loc-RIB. A FIB is a physical or logical table that stores routes used to forward network packets to the address destinations of the stored routes. A typical FIB stores only one route (the best route) for each address destination that is reachable through the network element that hosts the FIB. In a typical network element, a FIB is managed by a forwarding engine that is configured to receive network packets from other network elements and to forward these packets based on the routes installed in the FIB. A forwarding engine may comprise a set of hardware and/or software components capable of receiving and forwarding network traffic, and in different architectures the forwarding engine may be executing on a route processor or on a line card of a network element.

In a standard BGP implementation (such as, for example, a BGP implementation conforming to the BGP-4 standard defined in RFC1771 or to the MP-BGP standard defined in RCF2858), when the BGP session between two BGP hosts is closed or lost for whatever reason, each BGP host discards any routing information received from the other host and removes routes received from the other host from its RIBs and FIBs. Thus, when afterwards the two BGP hosts establish a new BGP session, in order to provide forwarding capabilities on each other's routes, the two BGP hosts need to go through the same time and resource consuming process of exchanging anew all of their routing information, running route selection algorithms, and installing the best routes in their respective FIBs.

In order to minimize the negative effects of such BGP restarts, a Graceful Restart mechanism for BGP has been proposed, the latest version of which was published by the IETF in December 2004 as draft-ietf-idr-restart-10.txt. The BGP Graceful Restart mechanism provides a new BGP capability, termed "Graceful Restart Capability", which is advertised by a BGP host during the set up of a BGP session with another BGP host. A BGP host that advertises a Graceful Restart capability to its BGP peer guarantees that it is capable of preserving the forwarding state of routes associated with one or more identified address families and of forwarding packets on these routes while its BGP process is restarting. The BGP host that advertises a Graceful Restart capability is commonly referred to as the restarting BGP speaker; the BGP peer that has established a BGP session to a restarting BGP speaker is commonly referred to as the receiving BGP speaker. According to the BGP Graceful Restart mechanism, while the BGP process on the restarting BGP speaker is restarting the routes in its Loc-RIB are marked as "stale"; however, no routes are removed from the FIB and forwarding of network packets on "stale" routes is not affected. (As referred to herein, a "stale" route is a route that has been received from a BGP session that has since become unavailable.) When the receiving BGP speaker detects that the BGP session to the restarting BGP speaker has become unavailable, the receiving BGP speaker marks as stale the routes in its Loc-RIB that have previously been received from the restarting BGP speaker. The receiving BGP speaker, however, does not remove these routes from its FIB and the forwarding of network packets on these routes is not affected.

Network elements or devices built on certain hardware platforms may include multiple forwarding engines and may provide software or hardware failover mechanisms for switching from one forwarding engine to another. For example, some routers provide an active forwarding engine (with an active FIB) on a particular route processor or a line card, and a stand-by forwarding engine (with a stand-by FIB) on a different route processor or a line card. If a transport protocol session established at such router fails, the active forwarding engine automatically fails over to the stand-by forwarding engine. Typically, a forwarding engine failover requires re-installing the routes in the active FIB into the stand-by FIB before the failover is complete. On some network elements, the active FIB may be re-created at the stand-by forwarding engine by using special hardware or fast IPC mechanisms, and thus the forwarding engine failover at these network elements may be performed almost instantaneously.

However, on certain other network elements (such as the Cisco 10K Series router for example), it may take up to a few seconds to re-install the routes from the active FIB to the stand-by FIB. Network packets forwarded to such network elements during these transitional few seconds cannot be routed and must be dropped. Thus, an outage in the forwarding service provided by these network elements occurs. This problem is further exacerbated if a BGP process executing on such network element is configured to advertise to its BGP peers support for the BGP Graceful Restart capability. Such network element in effect advertises itself as a BGP host that provides the BGP Graceful Restart capability despite the fact that it physically cannot provide the BGP Graceful Restart guarantee of non-interrupted forwarding service during BGP restarts.

Based on the foregoing, there is a clear need for a technique that overcomes the above problem and provides for a non-interrupted forwarding service during BGP restarts.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a high level overview of one embodiment of a method for partial graceful restart in Border Gateway Protocol (BGP)

DETAILED DESCRIPTION

Figure 1A:
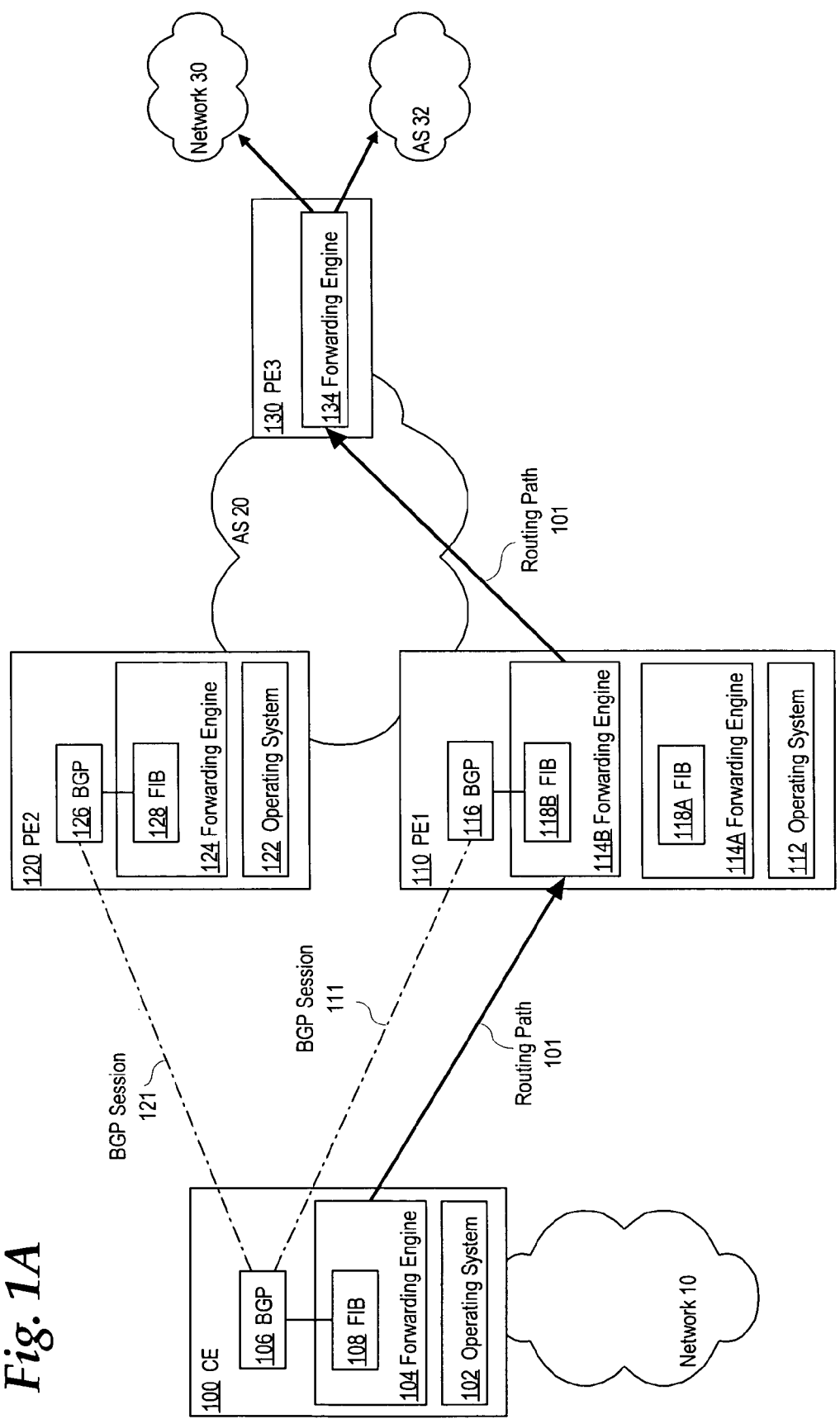
FIG. 1A is a block diagram that illustrates an overview of an example networking environment in which an embodiment may be implemented.

A method and apparatus for partial graceful restart in Border Gateway Protocol (BGP) are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural Overview of an Example Embodiment
3.0 Method of Partial Graceful Restart in BGP
 3.1 Functional Overview
 3.2 Negotiating Partial Graceful Restart in BGP
 3.3 Detecting the Unavailability of a BGP Session
 3.4 Embodiments for Control Plane Protocols Other Than BGP
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for partial graceful restart in BGP. A first BGP host detects that a first BGP session established between the first BGP host and a second BGP host has become unavailable. In a Forwarding Information Base (FIB) at the first BGP host, a first set of one or more routes to one or more address destinations is replaced with a second set of one or more routes to the one or more address destinations. The first set of one or more routes indicates that the one or more address destinations are reachable through the second BGP host. The second set of one or more routes indicates that the one or more address destinations are reachable through a third BGP host. After the first set of one or more routes is replaced in the FIB with the second set of one or more routes, the first BGP host redirects network traffic to the one or more address destination over the second set of one or more routes through the third BGP host. The first BGP host keeps forwarding network traffic to the one or more address destinations through the third BGP host for a period of time until the first BGP host establishes a new BGP session with the second BGP host. The first BGP host receives a BGP OPEN message from the second BGP host to open a new BGP session between the first BGP host and the second BGP host. The receipt of the BGP OPEN message signals to the first BGP host that forwarding of network traffic through the second BGP host may now be restored. In response to receiving the BGP OPEN message, the first set of one or more routes is re-installed in the FIB at the first BGP host. After the first set of one or more routes is re-installed in the FIB, the first BGP host resumes forwarding network traffic to the one or more address destinations over the first set of one or more routes through the second BGP host.

In a feature of this aspect, establishing the first BGP session between the first and the second BGP hosts comprises negotiating a BGP Graceful Restart capability, which indicates that the second BGP host is capable of forwarding packets on a third set of routes associated with one or more address families for a period of time during which a BGP session to the first BGP host is not available. In this feature, the third set of routes includes the first set of one or more routes to the one or more address destinations.

In one feature of the aspect, the first BGP host keeps the first set of one or more routes to the one or more address destinations in a Routing Information Base (RIB) even though the first BGP session has become unavailable.

In a feature of this aspect, replacing the first set of one or more routes with the second set of one or more routes in the FIB at the first BGP host comprises marking the first set of one or more routes in the FIB as stale and installing the second set of one or more routes in the FIB as best routes. In this feature, re-installing the first set of one or more routes in the FIB at the first BGP host comprises removing the second set of one or more routes from the FIB and marking the first set of one or more routes in the FIB as best routes.

In one feature of the aspect, the first BGP host keeps the first set of one or more routes to the one or more address destinations in a Routing Information Base (RIB) even though the first BGP session has become unavailable, and marks each of the routes of the first set in RIB as stale. In this feature, replacing the first set of one or more routes with the second set of one or more routes in the FIB at the first BGP host comprises removing the first set of one or more routes from the FIB and installing the second set of one or more routes in the FIB. Further, re-installing the first set of one or more routes in the FIB at the first BGP host comprises removing the second set of one or more routes from the FIB and installing the first set of one or more routes in the FIB.

In a feature of this aspect, the first BGP host forwards one or more packets to the one or more address destinations over at least one route of the second set of one or more routes during the period after the first BGP session has become unavailable.

In one feature of the aspect, the first set of one or more routes to the one or more address destinations is received at the first BGP host over the first BGP session from the second BGP host. The second set of one or more routes to the one or more address destinations is received at the first BGP host over a second BGP session that is established between the first BGP host and the third BGP host.

In a feature of this aspect, the first BGP host detects that the first BGP session has become unavailable by detecting that a transport protocol session between the first BGP host and the second BGP host has been closed. The transport protocol session may be any one of a transport protocol session over which the first BGP session was established and a transport protocol session over which the first BGP host forwards packets to the second BGP host. In this feature, the transport protocol session between the first BGP host and the second BGP host may be closed in order to switch over a first forwarding engine of the second BGP host to a second forwarding engine of the second BGP host.

In one feature of the aspect, the first BGP host detects that the first BGP session has become unavailable by using a Bidirectional Forwarding Detection (BFD) protocol to detect a failure of communications between the first BGP host and the second BGP host.

In other aspects, the invention encompasses a computer apparatus and a computer-readable medium configured to carry out the foregoing steps.

2.0 Structural Overview of an Example Embodiment

FIG. 1A is a block diagram that illustrates an overview of an example networking environment in which an embodiment of the techniques described herein may be implemented.

A customer edge (CE) router CE 100 is established at the edge of customer network 10. CE 100 is configured for routing customer network traffic to one or more address destinations that are reachable through autonomous system (AS) 20. As depicted in FIG. 1A, AS 20 comprises at least three provider edge (PE) routers: PE1 110, PE2 120, and PE3 130. PE1 110, PE2 120, and PE3 130 are routers that are configured for receiving network traffic from other autonomous systems or customer networks (such as, for example, customer network 10), and for routing the received network traffic through AS 20 to the desired network destinations, which may be various other autonomous systems or customer networks (such as, for example customer network 30 and AS 32). In different operational contexts, customer network 10 may be the computer network of any entity, such as, for example, a governmental, business, or educational institution, and AS 20 may comprise one or more networks of an Internet Service Provider (ISP) that provides network services to one or more customers associated with one or more customer networks. The techniques for partial graceful restart in BGP described herein, however, are not limited to any particular operational context or networking environment, and for this reason the networking environment depicted in FIG. 1A is to be regarded in an illustrative rather than a restrictive sense.

CE 100 is a BGP host that executes operating system 102, BGP process 106 and forwarding engine 104. Forwarding engine 104 includes forwarding information base (FIB) 108, and is configured for routing network traffic based on the routes stored in FIB 108. BGP process 106 is communicatively and/or operatively connected to FIB 108, and is configured for managing the routes stored in the FIB by, for example, installing and removing routes as necessary. BGP process 106 stores and manages the routing information received from other BGP hosts in a routing information base (RIB) (not shown in FIG. 1A).

PE1 110, PE2 120, and PE3 130 are routers established in AS 20. PE1 110, PE2 120, and PE3 130 may be configured for receiving and forwarding network traffic to and from each other over a wide variety of network layer protocols, such as, for example, Internet Protocol version 4 (IPv4), IPv6, Internetwork Packet eXchange (IPX), and AppleTalk. Further, PE1 110, PE2 120, and PE3 130 may also be configured for exchanging multi-protocol routing information (such as, for example, routing information for IPv4, IPv6, Virtual Private Network (VPN) over IPV4, VPN over IPv6, etc.) over a wide variety of control plane protocols (such as, for example, BGP, Label Distribution Protocol (LDP), Open Shortest Path First (OSPF), etc.) However, in order not to unnecessarily obscure the techniques described herein, the details regarding the interconnectivity among PE1 110, PE2 120, and PE3 130 over different protocols are not depicted in FIG. 1A.

PE1 110 is a BGP host that executes operating system 112, BGP process 116, forwarding engine 114A, and forwarding engine 114B. Forwarding engine 114A includes FIB 118A, and is configured for routing network traffic based on the routes stored in FIB 118A. Forwarding engine 114B includes FIB 118B, and is configured for routing network traffic based on the routes stored in FIB 118B. PE1 1 110 is capable of designating either of forwarding engines 114A and 114B as active or stand-by, and is capable of switching over the forwarding of network traffic from an active forwarding engine to a stand-by forwarding engine. (As depicted in FIG. 1A, forwarding engine 114B is active and forwarding engine 114A is stand-by.) BGP process 116 is capable of being communicatively and/or operatively connected to the FIB of the active forwarding engine, (FIB 118B as depicted in FIG. 1A), and is configured for managing the routes stored in that FIB by installing and removing routes as necessary. BGP process 116 stores and manages the routing information received from other BGP hosts in a RIB (not shown in FIG. 1A). In different embodiments, depending on the router architecture, PE1 110 may further comprise multiple BGP processes and multiple active and stand-by forwarding engines. Further, the forwarding engines may be implemented in a variety of ways including, but not limited to, as separate processes or services running in a router and as separate instances of the same forwarding service. (As used herein, a forwarding service refers generally to performing the tasks of receiving and forwarding network packets at a network element.)

Similarly, PE2 120 is a BGP host that executes operating system 122, BGP process 126 and forwarding engine 124. Forwarding engine 124 includes FIB 128, and is configured for routing network traffic based on the routes stored in FIB 128. BGP process 126 is communicatively and/or operatively connected to FIB 128, and is configured for managing the routes stored in the FIB by installing and removing routes as necessary. BGP process 126 stores and manages the routing information received from other BGP hosts in a RIB (not shown in FIG. 1A).

PE3 130 comprises forwarding engine 134 that is configured for receiving network traffic from network elements in AS 20 (such as, for example, PE1 110 and PE2 120), and for forwarding such traffic to destinations that are reachable through other networks or autonomous systems (such as, for example, network 30 and AS 32). PE3 130 also comprises various other components, such as, for example, an operating system, one or more BGP processes, and a FIB; however, these various components are not depicted in FIG. 1A in order not to unnecessarily obscure the techniques described herein.

As depicted in FIG. 1A, in operation BGP process 106 of CE 100 has established BGP session 111 with BGP process 116 of PE1 110. BGP process 106 has also established BGP session 121 with BGP process 126 of PE2 120.

Further, BGP process 106 has received over BGP session 111 routes to one or more address destinations (such as, for example, address destinations in network 30) that are reachable through PE1 110. BGP process 106 has also received, over BGP session 121, routes to the same one or more address destinations that are reachable through PE2 120. Based on its route selection algorithms, BGP process 106 has determined that the routes received over BGP session 111 from PE1 110 are the best routes to the one or more address destinations; thus, BGP process 106 has installed the best routes in FIB 108 of forwarding engine 104. In addition, BGP process 106 has also determined that the routes received over BGP session 121 from PE2 120 are not the best routes to the one or more destinations; thus, BGP process 106 stores these routes in its RIB but has not installed these routes in FIB 108. Hence, by virtue of BGP sessions 111 and 121, CE 100 is performing as a dual-homed system. (As referred to herein, a dual-homed system may be a network element in which the same address destinations may be reached through two or more different next-hop network elements.)

Forwarding engine 104 of CE 100 continuously receives network packets from other network elements, servers, or workstations in network 10 and forwards these network packets based on the routes installed in FIB 108. For illustration purposes, suppose that forwarding engine 104 continuously receives one or more packets and determines, based on information included in these packets, that the packets are sent to one or more address destinations in network 30. Based on the routes installed in FIB 108, forwarding engine 104 determines that the one or more address destinations in network 30 are reachable through PE1 110 and sends these network packets to forwarding engine 114B of PE1 110. Forwarding engine 114B receives and forwards the packets to forwarding engine 134 of PE3 130, which in turn forwards the packets to a network element established on the edge of network 30. Thus, the routing path 101 from CE 100 to PE3 130, over which forwarding engine 104 sends packets to address destinations in network 30, includes at least forwarding engine 114B and forwarding engine 134. (Routing path 101 from CE 100 to PE3 130 may also include numerous other network elements, such as routers, bridges, switches, etc.; however, such additional network elements are not particularly relevant to the techniques described herein and consequently are not depicted in FIG. 1A.)

Suppose that at a particular point in time BGP session 111 between BGP process 106 and BGP process 116 becomes unavailable. BGP session 111 may become unavailable for a variety of reasons including, but not limited to, an unexpected failure of the BGP session itself, an unexpected failure of the TCP session or the TCP connection over which the BGP session is established, a planned closure of the BGP session, a planned closure of the TCP session, and any unexpected failure of a hardware component that participates in executing BGP process 116 or forwarding engine 114B.

Figure 1B:
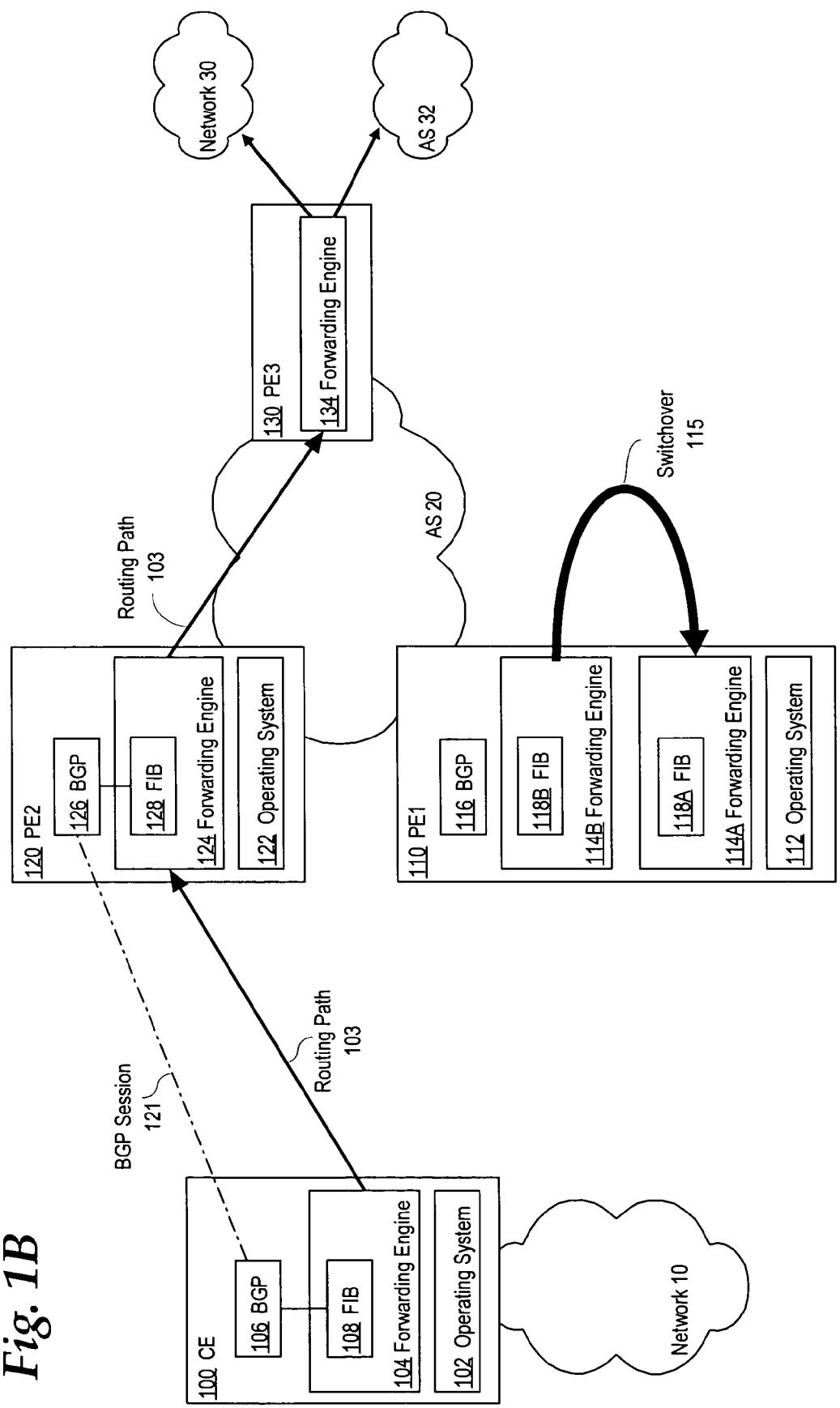
FIG. 1B is a block diagram that illustrates the networking environment depicted in FIG. 1A during the implementation of an embodiment.

In response to detecting that BGP session 111 has become unavailable, an embodiment of the techniques for partial graceful restart in BGP described herein are performed at CE 100. FIG. 1B is a block diagram that illustrates the networking environment depicted in FIG. 1A during the implementation of such embodiment.

As depicted in FIG. 1B, BGP session 111 has become unavailable and PE1 110 is in the process of switching forwarding engine 114B over to forwarding engine 114A. During the period of time in which this switchover 115 takes place, PE1 110 is incapable of receiving and forwarding network packets.

According to the techniques described herein, in response to detecting that BGP session 111 has become unavailable, BGP process 106 determines that PE1 110 is not capable of forwarding network traffic during switchover 115. Depending on the particular embodiment, BGP process 106 can make this determination in a variety of ways. For example, BGP process 116 may have indicated during the establishing of BGP session 111 that it is incapable of forwarding packets during forwarding engine failover. In another example, BGP process 116 may have indicated during the establishing of BGP session 111 that it is capable of supporting a BGP Graceful Restart during BGP restarts, and in response BGP process 106 may have been configured to presume that during such BGP restarts PEI 110 is not capable of forwarding network traffic.

In response to determining that switchover 115 is taking place at PE1 110, BGP process 106 first removes from FIB 108 the routes to the one or more address destinations that are reachable through PE1 110, and marks these routes as stale in its RIB. Next, or concurrently with the preceding step, BGP process 106 installs in FIB 108 the routes to the same one or more destinations, which routes it has received over BGP session 121 from PE2 120. In this way, forwarding engine 104 is capable of continuing to forward packets to the one or more address destinations without any packet loss. In embodiments in which PE1 110 has indicated BGP Graceful Restart capability, BGP process 106 may perform the above steps as part of its response as a receiving BGP speaker.

For example, suppose that forwarding engine 104 receives network packets that are sent to network 30 while switchover 115 is taking place. Based on the routes currently installed in FIB 108, forwarding engine 104 forwards these network packets to forwarding engine 124 of PE2 120. Forwarding engine 124 receives the packets and forwards them to forwarding engine 134 of PE3 130, which in turn forwards the packets to a network element established on the edge of network 30. Thus, the routing path 103 from CE 100 to PE3 130, over which forwarding engine 104 sends packets to address destinations in network 30, now includes at least forwarding engine 124 and forwarding engine 134. In this way, forwarding engine 104 is able to bypass PE1 110 (which is performing switchover 115 and is incapable of providing forwarding services) while at the same time guaranteeing that no packet loss will occur for network traffic sent to address destinations in network 30. Forwarding engine 104 continues to send over routing path 103 all packets destined to network 30 while switchover 115 is taking place at PE1 110.

Figure 1C:
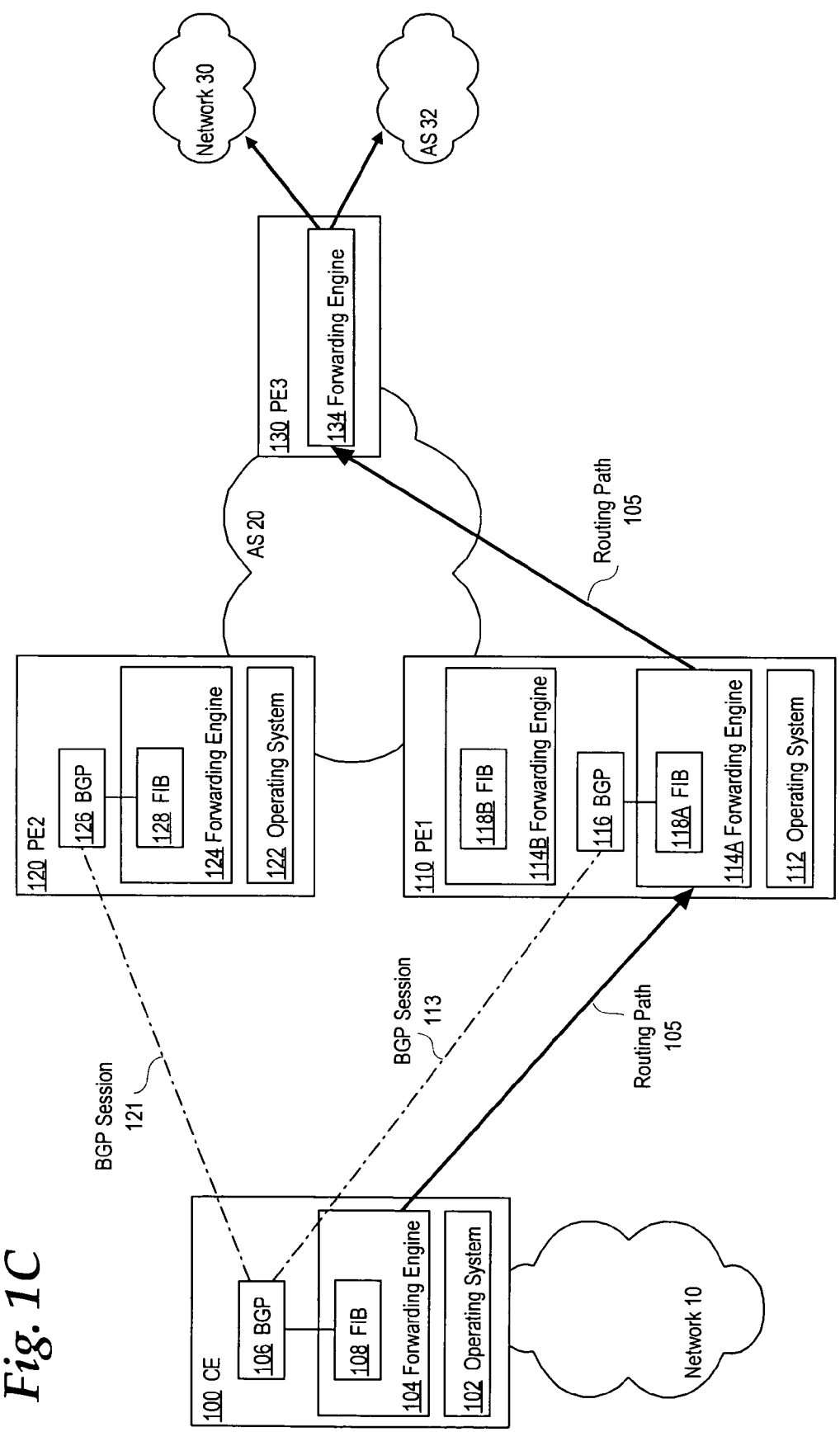
FIG. 1C is a block diagram that illustrates the networking environment depicted in FIG. 1A after an embodiment has been implemented.

FIG. 1C is a block diagram that illustrates the networking environment depicted in FIG. 1A after an embodiment has been implemented. When PE1 110 has completed switching over from forwarding engine 114B to forwarding engine 114A, PE1 110 notifies BGP process 116 accordingly. BGP process 116 then sends a BGP OPEN message to BGP process 106 at CE 100 to request the establishing of a new BGP session 113.

According to the techniques described herein, in response to receiving the BGP OPEN message from BGP process 116, BGP process 106 determines that the forwarding engine switchover at PE1 110 has completed. BGP process 106 then removes from FIB 108 the routes to the one or more address destinations that are reachable through PE2 120. Next, or concurrently with, BGP process 106 marks as best routes and/or unmarks as stale the routes to the same one or more destinations, which routes it has previously received over BGP session 111 from PE1 110. BGP process 106 then installs these best routes in FIB 108. In this way, the forwarding of packets to the one or more destinations through PE1 110 is restored, albeit through forwarding engine 114A.

For example, suppose that thereafter forwarding engine 104 receives network packets that are sent to network 30. Based on the routes currently installed in FIB 108, forwarding engine 104 forwards these network packets to forwarding engine 114A of PE1 110. Forwarding engine 114A receives the packets and forwards them to forwarding engine 134 of PE3 130, which in turn forwards the packets to a network element established on the edge of network 30. Thus, the routing path 105 from CE 100 to PE3 130, over which forwarding engine 104 sends packets to address destinations in network 30, now includes at least forwarding engine 114A and forwarding engine 134. In this way, the forwarding of packets through PE1 110 has been restored. Forwarding engine 104 continues to send over routing path 105 all packets destined to network 30 thereafter.

The techniques described herein are not limited to the particular networking environment and operational context described in FIGS. 1A-1C. For example, the techniques described herein may be implemented by any two BGP hosts in any type of networking environment including, but not limited to, BGP hosts within an autonomous system, BGP hosts established in different autonomous systems, BGP hosts established in the same customer network, BGP hosts established in adjacent customer networks of the same or different customer, BGP hosts established on the edges of a network, BGP hosts established within a network, BGP hosts that perform as BGP route reflectors, and between a BGP host and a BGP route reflector. In addition, BGP hosts that implement the techniques described herein may include any BGP-executing network element of any architecture including, but not limited to, multi-processor routers, routers having multiple route processors, and routers having multiple line cards. For these reasons, the networking environment, the operational context, and the network elements depicted in FIGS. 1A-1C are to be regarded in an illustrative rather than a restrictive sense.

3.0 Method of Partial Graceful Restart in BGP 3.1 Functional Overview

Techniques for partial graceful restart in BGP are described herein for network elements in which the transition from an active forwarding engine to a stand-by forwarding engine takes a certain period of time. A BGP host that performs such a transition is referred to herein as the restarting BGP host; the BGP host which peers with, and sends network traffic through, the restarting BGP host is referred to herein as the receiving BGP host.

In one embodiment, each of the restarting and receiving BGP hosts comprises a control plane and a forwarding plane. A control plane is generally a set of protocols and components executing in a network element that facilitate the receiving and managing of routing information. A forwarding plane is generally a set of protocols and components executing in a network element that facilitate the routing and forwarding of network traffic based on the routing information provided by the control plane. According to the techniques for partial graceful restart in BGP described herein, the restarting BGP host uses events happening at the control plane to signal to the receiving BGP host that it should re-route network traffic around the restarting BGP host during the transition period of time in which the restarting BGP host is restarting its BGP process or is switching over one forwarding engine to another.

For example, during the establishing of a BGP session, the receiving BGP host is notified that it takes a certain amount of time for its restarting BGP peer to switch over from one forwarding engine to another. Thus, if the receiving BGP host is a dual-homed system, the receiving BGP host knows that it should route network traffic around the restarting BGP host during the time it takes the restarting BGP host to switch over. When the receiving BGP host detects that the BGP session to the restarting BGP host has become unavailable, the receiving BGP host temporarily starts forwarding network traffic to a different network element. When the switchover at the restarting BGP host is completed, the restarting BGP host sends a BGP OPEN message to the receiving BGP host in order to open a new BGP session, thus signaling to the receiving BGP host that it may resume sending network traffic to the restarting BGP host. In this way, the restarting BGP host uses the loss and then the re-establishment of a BGP session (which are control plane events) to signal when and for how long it is appropriate for the receiving BGP host to re-route network traffic around the restarting BGP host. Further, by using such control plane signaling, the techniques described herein allow the receiving BGP host to avoid making drastic changes in its FIB and to temporarily forward network packets to other network elements knowing that the restarting BGP host will soon be available.

FIG. 2 is a flow diagram that illustrates a high level overview of one embodiment of a method for partial graceful restart in BGP. In FIG. 2, BGP host 200 is a receiving BGP host and BGP host 201 is a restarting BGP host.

In steps 202 and 203, BGP host 200 and BGP host 201 exchange a series of messages in order to establish a BGP session. In some embodiments, during the establishing of the BGP session, BGP host 201 notifies BGP host 200 of the fact that BGP host 201 cannot instantaneously switchover its forwarding service and that during a certain amount of time during such switchover it cannot forward network packets. For example, a BGP Graceful Restart capability negotiation may occur. In other embodiments, BGP host 200 may be configured to expect such behavior from BGP host 201 by default. Once the BGP session is established, BGP host 200 receives from BGP host 201 a first set of one more routes to address destinations reachable through BGP host 201. BGP host 200 then determines that this first set of one or more routes are the best routes to the one or more address destinations, installs this first set of one or more routes in its FIB, and then continuously forwards network packets on the routes in this first set.

Sometime thereafter, in step 204 BGP host 200 detects that the previously established BGP session with BGP host 201 has become unavailable. The BGP session may have become unavailable for a variety of reasons such as, for example, a planned failover of the forwarding service at BGP host 201 or because of a transport session failure. Concurrently or about the time of step 204, BGP host 201 starts to switch over its active forwarding engine to a second, stand-by forwarding engine.

In response to detecting that the BGP session to BGP host 201 has become unavailable, BGP host 200 replaces in its FIB the first set of one or more routes received from BGP host 201 with a second set of one more routes to the same address destinations, where the routes in the second set are received from a BGP host or a network element that is different than BGP host 201. In different embodiments, BGP host 200 may replace the first set of one or more routes with the second set by using a variety of mechanisms such as, for example, by removing the first set from the FIB and installing the second set in the FIB or by marking the routes of the first set in the FIB as stale and installing the routes of the second set as best routes in the FIB.

In step 208, BGP host 200 keeps in its RIB the first set of one or more routes received from BGP host 201 with the expectation that BGP host 201 will soon signal that it has restored its forwarding service. In some embodiments, depending on the particular BGP implementation BGP host 200 may also mark as stale these routes of the first set in its RIB.

In step 210, BGP host 200 continuously receives network packets to the one or more address destinations and forwards these network packets over the routes of the second set, which routes are currently installed in the FIB. In this way, BGP host 200 is able to route network traffic around BGP host 201 while BGP host 201 is switching over its forwarding service. BGP host 200 continues to forward network packets on the routes of the second set until it receives a BGP OPEN message from BGP host 201.

At some point, BGP host 201 completes the switchover of its forwarding service to its second forwarding engine. Then, in step 207, BGP host 201 sends a BGP OPEN message to BGP host 200 with a request to open a new BGP session. BGP host 200 receives the BGP OPEN message in step 212.

In response to receiving the BGP OPEN message in step 212, in step 214 BGP host 200 re-installs the first set of one more routes as best routes in its FIB. In this way BGP host 200 restores the forwarding of network packets to BGP host 201. Thereafter, in step 216 BGP host 200 forwards to BGP host 201 any received network packets that are sent to the address destinations reachable one the routes of the first set through BGP host 201.

In one embodiment, the steps of the method for partial graceful restart in BGP described above may be performed by the BGP processes executed by a restarting and a receiving BGP hosts. In other embodiments, various processes and/or components other than a BGP process executed by BGP hosts may perform some or all of the steps. Thus, the steps of the method described above are not limited to being performed by any particular processes or components, and any now known or later developed software and/or hardware components may be used to perform the steps of the method. Further, the method for partial graceful restart in BGP described herein may be performed by a restarting and a receiving BGP hosts in conjunction with, or as part of, any now known or later defined extension to BGP, such as, for example, the BGP Graceful Restart capability extension.

3.2 Negotiating Partial Graceful Restart in BGP

In some embodiments, a restarting BGP host may notify its BGP peers during the phase of negotiating a BGP session that it is capable of supporting the techniques for BGP partial graceful restart described herein. For example, a new Partial Graceful Restart BGP capability may be defined according to the mechanism for defining such capabilities that is described in *RFC*3392, which was published by the IETF in November 2002. Provided that the implementation of the BGP process executing on the receiving BGP host is capable of recognizing and handling this new Partial Graceful Restart capability, the restarting BGP host may advertise this capability in its BGP OPEN messages thus notifying the receiving BGP host to expect some outage in the forwarding service provided by the restarting BGP host during forwarding service switchover.

In some embodiments, the techniques for BGP partial graceful restart described herein may be negotiated by a restarting and a receiving BGP host as part of negotiating a BGP Graceful Restart capability. For example, the current mechanism for negotiating a BGP Graceful Restart capability may be modified to include a flag indicating whether a BGP host advertising the capability provides support for the BGP partial graceful restart techniques described herein. Alternatively, a new extension to BGP may be specified, which would re-define some of the current BGP Graceful Restart behavior and would incorporate the techniques described herein.

In some embodiments, the techniques for BGP partial graceful restart described herein may be applied by a BGP host only to routes of a particular address family. For example, a restarting BGP host and a receiving BGP host may negotiate to apply the techniques described herein in a BGP session with a BGP Graceful Restart capability only for routes that are associated with a particular combination of Address Family Identifier (AFI) and Subsequent Address Family Identifier (SAFI), such as, for example, an AFI/SAFI combination indicating the IPv4 family of network addresses. Further, in some embodiments a receiving and a restarting BGP host may negotiate to apply the techniques described herein for routes associated with one, some, or all of the address families for which the restarting BGP host provides forwarding service. Thus, the techniques described herein may be applied to any combination of any sets of routes associated with any now known or later defined address families.

3.3 Detecting the Unavailability of a BGP Session

In different embodiments, a BGP session between a restarting and a receiving BGP hosts may become unavailable for a wide variety of reasons including, but not limited to, an unexpected failure of the BGP session itself, an unexpected failure of the TCP session or the TCP connection over which the BGP session is established, a planned closure of the BGP session, a planned closure of the TCP session, and an unexpected failure of a hardware component or components that participate in executing the BGP process at the restarting BGP host. However, the techniques for BGP partial graceful restart described herein may be implemented by the receiving and restarting BGP hosts regardless of the type of the failure that caused the BGP session to fail. Further, the techniques described herein may be implemented in conjunction with any now known or later developed mechanism for detecting BGP session failures.

For example, in some embodiments a restarting BGP host may need to perform a planned switchover of its forwarding service from one forwarding engine to another. In these embodiments, the restarting BGP host may announce this fact to the receiving BGP host by, for example, sending a BGP NOTIFICATION message with an error code of "CEASE" which indicates a request for a normal session termination. Alternatively, or in addition, the restarting BGP host may announce this fact to the receiving BGP host by sending a message requesting the closure of the transport protocol session over which the BGP session runs, such as, for example, by sending a TCP segment with the FIN control bit set in the segment header. Thus, in these embodiments the receiving BGP host may detect the unavailability of the BGP session to the restarting BGP host by using the mechanisms provided for normal BGP and/or transport protocol session termination.

In some embodiments, a receiving BGP host may detect an unplanned unavailability of a BGP session to a restarting BGP host by using additional means, such as, for example, one or more protocols that are specifically designed and installed to monitor the availabilities of the BGP session and of its underlying the transport protocol session. An example of such protocol is the Bidirectional Forwarding Detection (BFD) protocol, the latest draft of which was submitted to the IETF as draft-ietf-bfd-base-04.txt in October 2005. BFD is a network protocol that may be used to detect faults in the communications between two network elements. It also provides low-overhead, low-latency detection of endpoint-to-endpoint session failures for a wide variety of protocols at different protocol stack layers, such as, for example, BGP and TCP.

3.4 Embodiments for Control Plane Protocols Other than BGP

The techniques described herein may be implemented as techniques for using events, which are detected at the control plane of a receiving network element, as a signal for the network element to make specific changes in its routing tables in order to facilitate the routing of network packets around a restarting network element. Further, the routing tables to which the receiving network element makes such changes may be maintained by any protocol that provides management and distribution of routing information.

For example, in addition to BGP, the techniques described herein may be implemented for the Label Distribution Protocol (LDP). The LDP specification is defined in RFC3036, which was published by the IETF in January 2001. LDP is a protocol from the Multi-Protocol Label Switching (MPLS) architecture that provides two label switching peers with the ability to exchange label mapping information over an LDP session. The label mapping information is typically stored in routing tables similar to the BGP RIB, and associates a label assigned to a packet with the network address of the network element at the next hop to which the packet is to be forwarded. Thus, the techniques described herein may be implemented for a wide variety of control plane protocols, and for this reason the embodiments of the techniques described herein with respect to BGP are to be regarded in an illustrative rather than a restrictive sense.

4.0 Implementation Mechanisms—Hardware Overview

Figure 3:
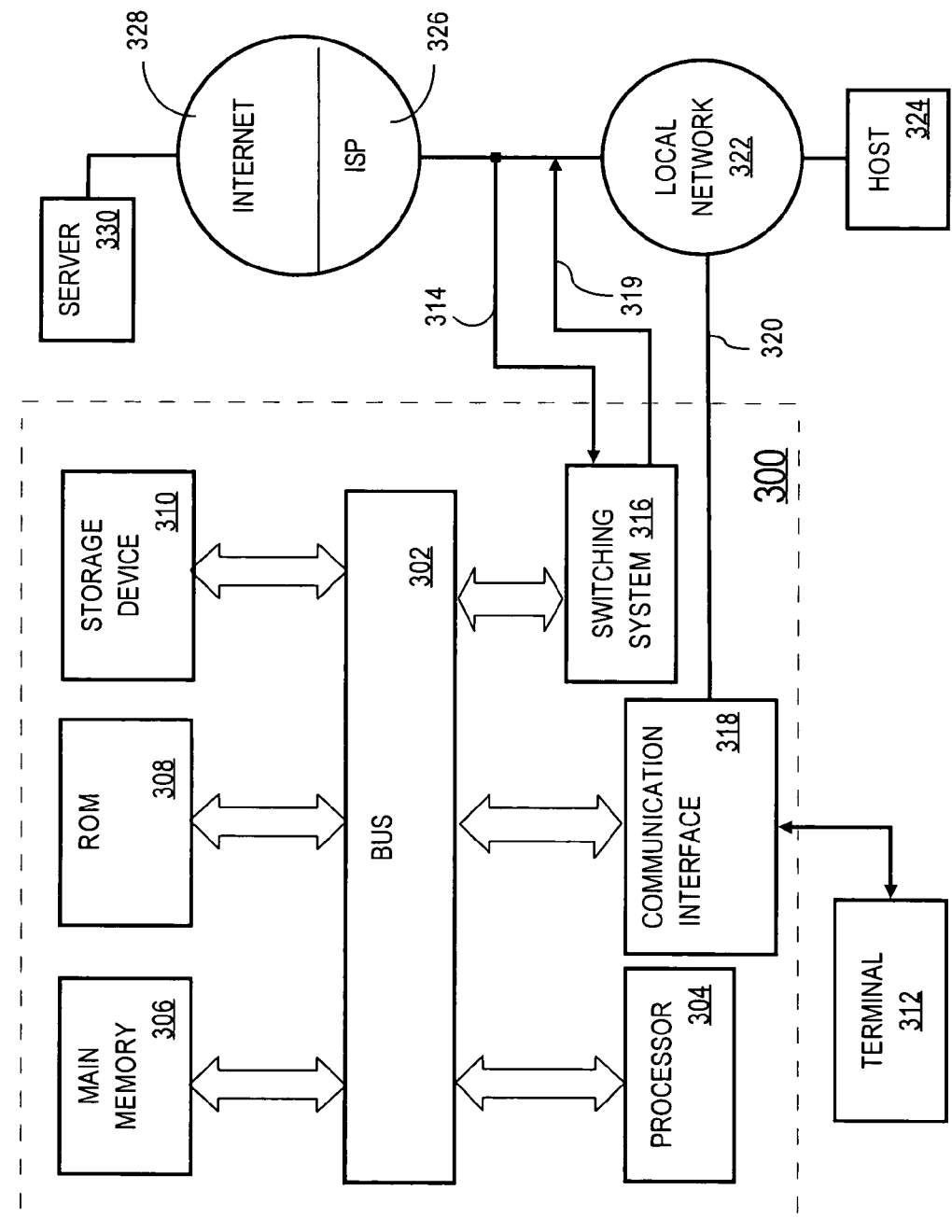
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for performing partial graceful restart in BGP. According to one embodiment of the invention, the steps of the technique for partial graceful restart in BGP are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for partial graceful restart in a control plane protocol as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for partial graceful restart in Border Gateway Protocol (BGP), the method comprising the computer-implemented steps of:
   at a first BGP host, detecting that a first BGP session established between the first BGP host and a second BGP host has become unavailable;
   in a Forwarding Information Base (FIB) at the first BGP host, replacing a first set of one or more routes to one or more address destinations with a second set of one or more routes to the one or more address destinations, wherein:
      the first set of one or more routes indicates that the one or more address destinations are reachable through the second BGP host; and
      the second set of one or more routes indicates that the one or more address destinations are reachable through a third BGP host;
   at the first BGP host, receiving a BGP OPEN message from the second BGP host to open a new BGP session between the first BGP host and the second BGP host; and
   in response to receiving the BGP OPEN message, re-installing the first set of one or more routes in the FIB at the first BGP host.

2. A method as recited in claim 1, further comprising, at the first BGP host, establishing the first BGP session with the second BGP host, wherein:
   establishing the first BGP session comprises negotiating a BGP Graceful Restart capability which indicates that the second BGP host is capable of forwarding packets on a third set of routes associated with one or more address families for a period of time during which a BGP session to the first BGP host is not available; and
   the third set of routes includes the first set of one or more routes to the one or more address destinations.

3. A method as recited in claim 1, further comprising keeping the first set of one or more routes to the one or more address destinations in a Routing Information Base (RIB) at the first BGP host even though the first BGP session has become unavailable.

4. A method as recited in claim 1, wherein:
   replacing the first set of one or more routes with the second set of one or more routes in the FIB at the first BGP host comprises:
      marking the first set of one or more routes in the FIB as stale; and
      installing the second set of one or more routes in the FIB as best routes; and
   re-installing the first set of one or more routes in the FIB at the first BGP host comprises:
      removing the second set of one or more routes from the FIB; and marking the first set of one or more routes in the FIB as best routes.

5. A method as recited in claim 1, wherein:
the method further comprises:
keeping the first set of one or more routes to the one or more address destinations in a Routing Information Base (RIB) at the first BGP host even though the first BGP session has become unavailable; and
marking each route of the first set of one or more routes in the RIB as stale;
replacing the first set of one or more routes with the second set of one or more routes in the FIB at the first BGP host comprises:
removing the first set of one or more routes from the FIB; and
installing the second set of one or more routes in the FIB; and
re-installing the first set of one or more routes in the FIB at the first BGP host comprises:
removing the second set of one or more routes from the FIB; and
installing the first set of one or more routes in the FIB.

6. A method as recited in claim 1, further comprising, at the first BGP host, forwarding one or more packets to the one or more address destinations over at least one route of the second set of one or more routes.

7. A method as recited in claim 1, wherein:
the first set of one or more routes to the one or more address destinations is received at the first BGP host over the first BGP session from the second BGP host; and
the second set of one or more routes to the one or more address destinations is received at the first BGP host over a second BGP session that is established between the first BGP host and the third BGP host.

8. A method as recited in claim 1, wherein detecting that the first BGP session has become unavailable further comprises detecting that a transport protocol session between the first BGP host and the second BGP host has been closed.

9. A method as recited in claim 8, wherein the transport protocol session between the first BGP host and the second BGP host is any one of:
a first transport protocol session with which the first BGP session was established; and
a second transport protocol session with which the first BGP host forwards packets to the second BGP host.

10. A method as recited in claim 8, wherein the transport protocol session is closed at the second BGP host in order to switch over a first forwarding engine of the second BGP host to a second forwarding engine of the second BGP host.

11. A method as recited in claim 1, wherein detecting that the first BGP session has become unavailable comprises using a Bidirectional Forwarding Detection (BFD) protocol to detect a failure of communications between the first BGP host and the second BGP host.

12. An apparatus operating as a first Border Gateway Protocol (BGP) host, comprising:
a network interface that is coupled to a data network for receiving one or more packet flows therefrom;
one or more processors; and
one or more stored sequences of instructions which, when executed by the one or more processors, cause the one or more processors to perform the steps of:
detecting that a first BGP session established between the first BGP host and a second BGP host has become unavailable;
in a Forwarding Information Base (FIB) at the first BGP host, replacing a first set of one or more routes to one or more address destinations with a second set of one or more routes to the one or more address destinations, wherein:
the first set of one or more routes indicates that the one or more address destinations are reachable through the second BGP host; and
the second set of one or more routes indicates that the one or more address destinations are reachable through a third BGP host;
receiving a BGP OPEN message from the second BGP host to open a new BGP session between the first BGP host and the second BGP host; and
in response to receiving the BGP OPEN message, re-installing the first set of one or more routes in the FIB at the first BGP host.

13. The apparatus of claim 12, further comprising instructions which, when executed by the one or more processors, cause the one or more processors to perform the step of establishing the first BGP session with the second BGP host, wherein:
establishing the first BGP session comprises negotiating a BGP Graceful Restart capability which indicates that the second BGP host is capable of forwarding packets on a third set of routes associated with one or more address families for a period of time during which a BGP session to the first BGP host is not available; and
the third set of routes includes the first set of one or more routes to the one or more address destinations.

14. The apparatus of claim 12, further comprising instructions which, when executed by the one or more processors, cause the one or more processors to perform the step of keeping the first set of one or more routes to the one or more address destinations in a Routing Information Base (RIB) at the first BGP host even though the first BGP session has become unavailable.

15. The apparatus of claim 12, wherein:
replacing the first set of one or more routes with the second set of one or more routes in the FIB at the first BGP host comprises:
marking the first set of one or more routes in the FIB as stale; and
installing the second set of one or more routes in the FIB as best routes; and
re-installing the first set of one or more routes in the FIB at the first BGP host comprises:
removing the second set of one or more routes from the FIB; and
marking the first set of one or more routes in the FIB as best routes.

16. The apparatus of claim 12, wherein:
the one or more stored sequences of instructions further comprise instructions which, when executed by the one or more processors, cause the one or more processors to perform the steps of:
keeping the first set of one or more routes to the one or more address destinations in a Routing Information Base (RIB) at the first BGP host even though the first BGP session has become unavailable; and
marking each route of the first set of one or more routes in the RIB as stale;
replacing the first set of one or more routes with the second set of one or more routes in the FIB at the first BGP host comprises:
removing the first set of one or more routes from the FIB; and installing the second set of one or more routes in the FIB; and re-installing the first set of one or more routes in the FIB at the first BGP host comprises:

removing the second set of one or more routes from the FIB; and installing the first set of one or more routes in the FIB.

17. The apparatus of claim 12, further comprising instructions which, when executed by the one or more processors, cause the one or more processors to perform the step of forwarding one or more packets to the one or more address destinations over at least one route of the second set of one or more routes.

18. The apparatus of claim 12, wherein:

the first set of one or more routes to the one or more address destinations is received at the first BGP host over the first BGP session from the second BGP host; and the second set of one or more routes to the one or more address destinations is received at the first BGP host over a second BGP session that is established between the first BGP host and the third BGP host.

19. The apparatus of claim 12, wherein detecting that the first BGP session has become unavailable further comprises detecting that a transport protocol session between the first BGP host and the second BGP host has been closed.

20. The apparatus of claim 19, wherein the transport protocol session between the first BGP host and the second BGP host is any one of:

a first transport protocol session with which the first BGP session was established; and a second transport protocol session with which the first BGP host forwards packets to the second BGP host.

21. The apparatus of claim 19, wherein the transport protocol session is closed at the second BGP host in order to switch over a first forwarding engine of the second BGP host to a second forwarding engine of the second BGP host.

22. The apparatus of claim 12, wherein detecting that the first BGP session has become unavailable comprises using a Bidirectional Forwarding Detection (BFD) protocol to detect a failure of communications between the first BGP host and the second BGP host.

23. An apparatus operating as a first Border Gateway Protocol (BGP) host, comprising:

means for detecting that a first BGP session established between the first BGP host and a second BGP host has become unavailable;

means for replacing, in a Forwarding Information Base (FIB) at the first BGP host, a first set of one or more routes to one or more address destinations with a second set of one or more routes to the one or more address destinations, wherein:

the first set of one or more routes indicates that the one or more address destinations are reachable through the second BGP host; and the second set of one or more routes indicates that the one or more address destinations are reachable through a third BGP host;

means for receiving, at the first BGP host, a BGP OPEN message from the second BGP host to open a new BGP session between the first BGP host and the second BGP host; and means for re-installing, in response to receiving the BGP OPEN message, the first set of one or more routes in the FIB at the first BGP host.

24. The apparatus of claim 23, further comprising means for establishing the first BGP session with the second BGP host, wherein:

the means for establishing the first BGP session comprise means for negotiating a BGP Graceful Restart capability which indicates that the second BGP host is capable of forwarding packets on a third set of routes associated with one or more address families for a period of time during which a BGP session to the first BGP host is not available; and the third set of routes includes the first set of one or more routes to the one or more address destinations.

25. The apparatus of claim 23, further comprising means for keeping the first set of one or more routes to the one or more address destinations in a Routing Information Base (RIB) at the first BGP host even though the first BGP session has become unavailable.

26. The apparatus of claim 23, wherein:

the means for replacing the first set of one or more routes with the second set of one or more routes in the FIB at the first BGP host comprise:

means for marking the first set of one or more routes in the FIB as stale; and means for installing the second set of one or more routes in the FIB as best routes; and the means for re-installing the first set of one or more routes in the FIB at the first BGP host comprise:

means for removing the second set of one or more routes from the FIB; and means for marking the first set of one or more routes in the FIB as best routes.

27. The apparatus of claim 23, further comprising:

means for keeping the first set of one or more routes to the one or more address destinations in a Routing Information Base (RIB) at the first BGP host even though the first BGP session has become unavailable; and means for marking each route of the first set of one or more routes in the RIB as stale;

wherein the means for replacing the first set of one or more routes with the second set of one or more routes in the FIB at the first BGP host comprise:

means for removing the first set of one or more routes from the FIB; and means for installing the second set of one or more routes in the FIB; and wherein the means for re-installing the first set of one or more routes in the FIB at the first BGP host comprise:

means for removing the second set of one or more routes from the FIB; and means for installing the first set of one or more routes in the FIB.

28. The apparatus of claim 23, further comprising means for forwarding one or more packets to the one or more address destinations over at least one route of the second set of one or more routes.

29. The apparatus of claim 23, wherein:

the first set of one or more routes to the one or more address destinations is received at the first BGP host over the first BGP session from the second BGP host; and the second set of one or more routes to the one or more address destinations is received at the first BGP host over a second BGP session that is established between the first BGP host and the third BGP host.

30. The apparatus of claim 23, wherein the means for detecting that the first BGP session has become unavailable further comprise means for detecting that a transport protocol session between the first BGP host and the second BGP host has been closed.

31. The apparatus of claim 30, wherein the transport protocol session between the first BGP host and the second BGP host is any one of:
- a first transport protocol session with which the first BGP session was established; and
- a second transport protocol session with which the first BGP host forwards packets to the second BGP host.

32. The apparatus of claim 30, wherein the transport protocol session is closed at the second BGP host in order to switch over a first forwarding engine of the second BGP host to a second forwarding engine of the second BGP host.

33. The apparatus of claim 23, wherein the means for detecting that the first BGP session has become unavailable comprise means for using a Bidirectional Forwarding Detection (BFD) protocol to detect a failure of communications between the first BGP host and the second BGP host.

\* \* \* \* \*